United States Patent [19]
Greene

[11] 3,885,430
[45] May 27, 1975

[54] VERTICAL SPEED COMMAND INSTRUMENT

[75] Inventor: Leonard M. Greene, Chappaqua, N.Y.

[73] Assignee: Safe Flight Instrument Corporation, White Plains, N.Y.

[22] Filed: Mar. 6, 1974

[21] Appl. No.: 448,541

[52] U.S. Cl. .................................. 73/179; 73/515
[51] Int. Cl. ........................................ G01c 21/10
[58] Field of Search .......... 73/179, 178 T; 244/77 D

[56] References Cited
UNITED STATES PATENTS
3,274,831   9/1966   Angst .................................... 73/179

Primary Examiner—Donald O. Woodiel
Attorney, Agent, or Firm—Edward A. Sokolski

[57] ABSTRACT

A bellows device is mounted in a casing contained within an aircraft such that a pressure differential is established between the inner and outer walls of the bellows in accordance with the vertical speed of the aircraft. This bellows device is coupled to an indicator to provide a drive signal for the indicator in accordance with such vertical speed. Coupled to the drive mechanism for the indicator through a slip-type coupling is a pendulum device which is adapted to measure horizontal acceleration (positive or negative) of the aircraft resulting from changes of thrust. Such acceleration is sensed by the pendulum and a signal in accordance therewith coupled through the slip coupling so as to drive the indicator along with the drive provided by the bellows device. By virtue of the pendulum's slip coupling, steady offsets are effectively "washed out" when the aircraft is not experiencing horizontal acceleration, as for example with changes in aircraft pitch attitude. Thus the pendulum provides an anticipatory climb (or descent) rate signal to the indicator in response to horizontal aircraft acceleration resulting from thrust changes, the indicator displaying a command signal for attaining the climb or descent rate indicated thereby.

8 Claims, 2 Drawing Figures

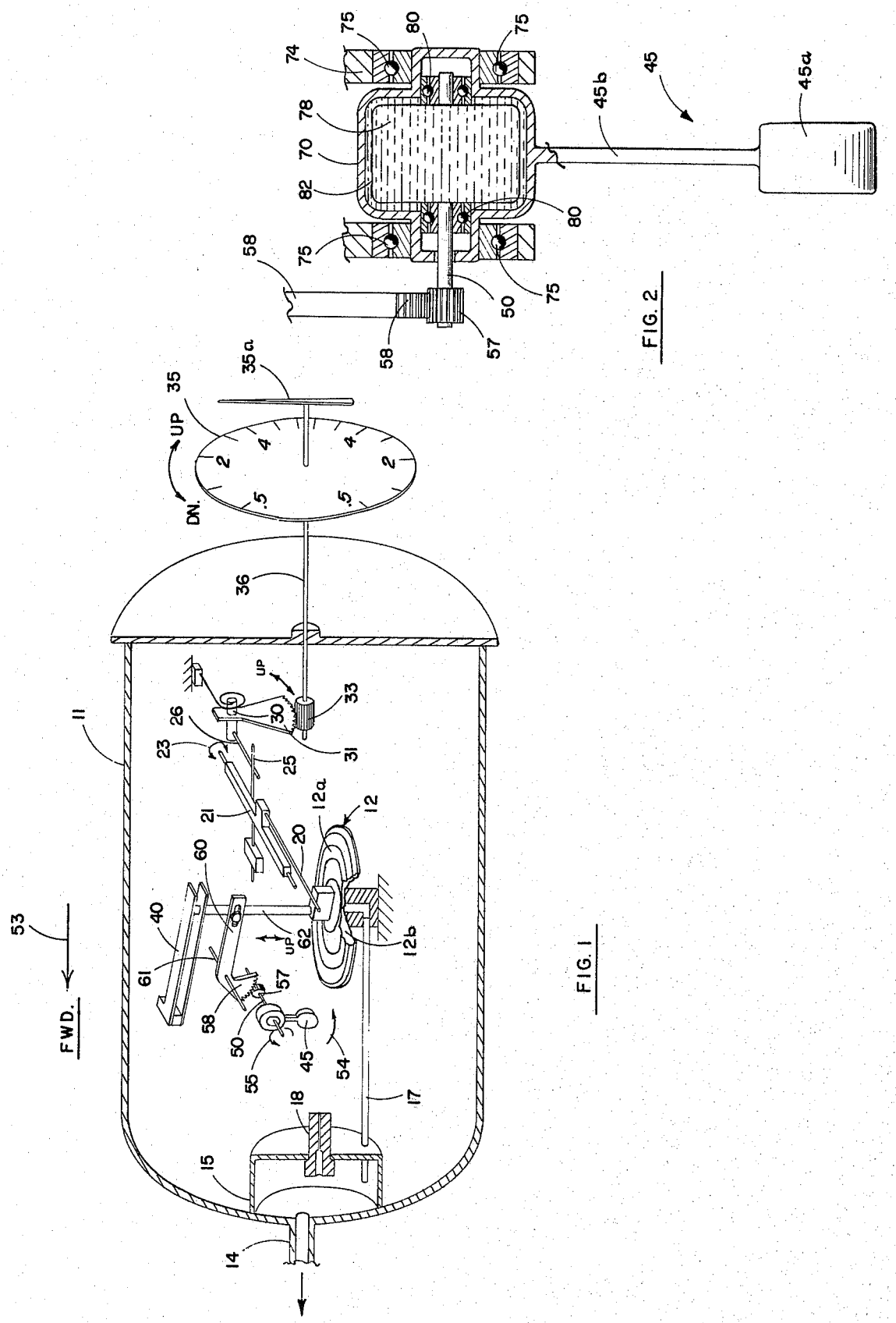

VERTICAL SPEED COMMAND INSTRUMENT

This invention relates to a vertical speed command instrument and more particularly to such a device which provides a signal in accordance with horizontal aircraft acceleration as an anticipatory signal for driving a vertical climb rate indicator.

It is to be understood that the term "acceleration" as used herein encompasses negative acceleration as well as positive acceleration, the instrument of the invention being capable of providing command signals for descent as well as ascent.

Rate of climb instruments utilizing bellows devices in their implementation whereby the air pressure differential between the inner and outer walls of the bellows provides a deflection of the bellows indicative of climb rate of an aircraft are well known in the art. It has been found that there is a certain time lag in the response of this type of instrument, which results in an error in the readout. In an effort to eliminate this error, the basic device has been modified to add a signal in accordance with the vertical acceleration of the aircraft to the pneumatically derived climb rate signal. Devices of this type are described in U.S. Pat. Nos. 2,751,785 and 2,973,643, wherein the vertical acceleration signal is generated by means of a spring mounted mass. This type of prior art device, while providing some compensation for the lag of the instrument, does not provide a command signal which provides lead information which will enable the pilot to accurately and smoothly bring the aircraft to the desired climb rate.

The device of the present invention overcomes this shortcoming in providing a command indication signal to enable the achievement of the aforementioned desired end result by generating a signal in accordance with horizontal aircraft acceleration which is added to the pneumatically derived climb rate signal. Thus, as the horizontal acceleration of the aircraft is increased, due to a thrust change as is the case prior to starting a climb, a signal reflecting the anticipated climb rate is provided to the indicator such that a readout is provided as a command signal, i.e., the pilot is enabled to achieve a desired climb rate by flying the aircraft to maintain the indicator at the desired climb rate. The device of this invention thus is not merely an indicator as are the prior art devices, but rather is a command instrument.

It is therefore an object of this invention to provide an instrument which can be utilized by the pilot to fly to a desired climb or descent rate.

It is a further object of this invention to facilitate the maneuvering of an aircraft to achieve a desired climb or descent rate.

Other objects of the invention will become apparent as the description proceeds in connection with the accompanying drawings, of which:

FIG. 1 is a schematic illustration of a preferred embodiment of the invention; and FIG. 2 is a cross sectional view illustrating one implementation of the acceleration sensing mechanism of the preferred embodiment.

Briefly described, the device of the invention is as follows: A bellows device is utilized to pneumatically sense vertical climb rate and provides a mechanical actuation in accordance with the air pressure differential between the inner and outer walls of the bellows. This mechanical signal is fed through a mechanical linkage to drive an indicator needle. A horizontal acceleration sensor is provided in the form of a pendulously suspended mass. The pendulum formed by the mass and its suspension arm is coupled through a slip coupling, which in the preferred embodiment is a fluid coupling, to the indicator linkage so as to provide a deflection of the indicator to indicate a climb or descent rate in accordance with acceleration of the aircraft in which the instrument is installed. Static deflections of the pendulum are prevented from affecting the output signal by virtue of the slip coupling which does not transmit a signal for static positioning of the pendulum with changes in aircraft pitch angle, horizontal acceleration signals alone being coupled to the indicator. Thus, the indicator responds to a signal in accordance with the sum of the pneumatically measured vertical climb rate and the horizontal acceleration of the aircraft, thereby providing a command signal enabling the pilot to smoothly reach the climb or descent rate shown by the indicator. The device of the invention is particularly useful in a STOL (short take-off and landing) aircraft.

Referring now to FIG. 1, a schematic drawing of a preferred embodiment of the invention is illustrated. Contained within casing 11 is bellows device 12 which inflates and deflates in accordance with the pressure differential between its outside walls 12a and its inside walls 12b. Static air at the pressure on the outside of the aircraft is fed from a static pressure source through line 14 into inner casing 15 and thence through line 17 to the interior of bellows 12. A restricted communications path is provided to the interior of casing 11 for the air in inner casing 15 through metering orifice 18.

When the aircraft is flying at a constant altitude, there is no pressure differential between the inner walls 12b and the outer walls 12a of the bellows, in view of the fact that sufficient air can pass through orifice 18 over a short period of time to bring the pressure within casing 11 to that of the air being fed to inner casing 15. It is to be noted at this point that, except for the small opening provided by orifice 18, container 11 is substantially sealed up. Thus when the aircraft is flying at a constant altitude, bellows 12 is maintained by springs 40 in a predetermined "neutral" state.

When, however, the aircraft is climbing or descending, a pressure differential is established between the inner and outer walls of the bellows. By virtue of the restricted air path provided through orifice 18, the pressure between the inside of casing 11 cannot equalize with the pressure in casing 15 while the aircraft is climbing or descending. The differential between the pressure on the inside of casing 11 and the inside of casing 15 is a direct function of the rate of altitude change.

Bellows 12 is contracted for climb and expanded for descent of the aircraft and this mechanical signal is coupled from the bellows through arm 20 to rotatably drive pivotally mounted shaft 21 as indicated by arrows 23. The rotatable output of shaft 21 is coupled through linkages 25 and 26 to rotatably drive shaft 30. Shaft 30 in turn drives gear member 31 which drives pinion gear 33 which is coupled to the needle 35a of indicator device 35 by means of shaft 36. Bellows 12 is maintained in an equilibrium position providing a zero reading on indicator 35 when there is no pressure differential being sensed by bellows 12, by means of springs 40. The device thus far described is a rate of climb meter well known in the prior art.

Now to be described are means for adding a signal in accordance with horizontal acceleration of the aircraft to the pneumatically generated climb rate signal just described. This end result is achieved by means of pendulum member 45, which is rotatably supported as to be described in connection with FIG. 2, and is coupled through a slip type coupling to shaft 50. This slip type coupling, which may be a fluid coupling as shown in FIG. 2, or may be a magnetic coupling, is such that it will couple acceleration forces generated by pendulum member 45 but with the pendulum in a static displaced condition such as, for example, after the aircraft has assumed a new pitch angle, will not transmit a signal in accordance with the orientation of the pendulum relative to the aircraft frame to shaft 50. Thus, when the aircraft is positively accelerated in the direction indicated by arrow 53, pendulum 45 will move in the direction indicated by arrow 54 and it will rotatably drive shaft 50 in a counterclockwise direction as indicated by arrow 55. This drive signal, which will be in accordance with the amount of acceleration of the aircraft, will be coupled through gears 57 and 58 to rotatably drive arm member 60 on shaft 61. Arm member 60 is coupled to rod 62 which in turn is attached to the output linkage of bellows 12. Thus, the acceleration signal is transmitted to the drive mechanism for indicator 35 to provide an additive signal thereto in response to aircraft horizontal acceleration.

Referring now to FIG. 2, an embodiment of the pendulum drive mechanism just described is illustrated in detail. Pendulum 45 comprises a pendulous mass 45a which is suspended by means of arm 45b from support member 70. Pendulum support member 70 is rotatively rotatably on bracket member 74 by means of ball bearings 75, bracket member 74 being attached to the wall of casing 11. Shaft 50 is fixedly attached to cylindrical member 78, this cylindrical member being rotatably supported in support member 70 by means of ball bearings 80. A viscous fluid coupling 82, which may be formed by silicone fluid, is placed between cylindrical member 78 and pendulum support member 70. With acceleration of pendulous mass 45a, the fluid coupling transmits sufficient torque to cylinder 78 to rotatably drive shaft 50, this rotatable motion being transmitted through gear 57 to gear 58 to actuate the indicator as described in connection with FIG. 1. However, with the pendulous mass in a static condition, or when moving in a non-accelerating manner, slippage will occur at the fluid bearing so that shaft 50 will not follow motion of the pendulum. Thus shaft 50 will only respond to acceleration forces sensed by the pendulum and will be driven back to a position in accordance with the drive provided solely by bellows mechanism 12 after the acceleration has disappeared, even though the pendulum may assume a displaced orientation due to a new aircraft pitch angle.

It is to be noted that while a fluid type slip coupling has been described and shown in FIG. 2, other types of slip couplings such as, for example, magnetic couplings could be utilized to equal advantage.

The device of the invention may be utilized by the pilot as follows: When the pilot decides he wants to make a climbing maneuver at a particular climb rate, he first adjusts his thrust to provide a horizontal acceleration of the aircraft which will cause needle 35a to point to the desired climb rate. This end result is implemented by virtue of the movement of pendulum 45 with the acceleration of the aircraft. The pilot continues to fly the aircraft to maintain needle 35a at the desired climb rate but as his vertical speed changes, a signal will be provided from bellows 12 to drive the needle and thus less and less horizontal acceleration will be needed to maintain the needle at the desired climb rate. The horizontal acceleration will finally go to zero with the pneumatically derived bellows signal providing the total drive for indicator 35. As already noted, even though the aircraft may have assumed a new pitch angle and the pendulum a corresponding new orientation, the fluid coupling will provide slippage between the pendulum support and shaft 50 so that this new orientation will not be reflected by indicator 35. The fluid coupling thereby serves to "wash out" any steady offsets due to the pitch attitude of the aircraft. It should be immediately apparent that the instrument can also be used to descend at a particular descent rate by adjusting thrust to provide an aircraft deceleration which will cause the needle to point to the desired descent rate.

Thus, the device of the invention can be utilized as a vertical speed command indicator to enable the pilot to fly the aircraft to attain a desired climb or descent rate.

While the invention has been described and illustrated in detail, it is to be clearly understood that this is intended by way of illustration and example only and is not to be taken by way of limitation, the spirit and scope of this invention being limited only by the terms of the following claims.

I claim:

1. A vertical speed command for an aircraft comprising:
    means for pneumatically sensing the rate of aircraft altitude change as a function of the rate of change of ambient air pressure outside the aircraft and providing a mechanical signal in accordance therewith;
    an indicator;
    means for coupling the mechanical signal from said sensing means to drive said indicator;
    means for providing a mechanical signal in accordance with the horizontal acceleration of the aircraft; and
    means for coupling said mechanical signal in accordance with horizontal acceleration to said indicator,
    whereby the indicator indicates the rate of change of aircraft altitude which will be attained for a given horizontal aircraft thrust change at the commencement of a change of altitude maneuver and indicates actual rate of aircraft altitude change when horizontal acceleration has terminated.

2. The device of claim 1 wherein said means for sensing horizontal aircraft acceleration comprises a pendulum, means for pivotally supporting said pendulum, and slip-coupling means for coupling said pendulum to the drive means for said indicator.

3. The device of claim 2 wherein said slip-coupling means comprises a fluid coupling.

4. The device of claim 1 wherein said pressure sensing means comprises a bellows and said means for coupling said pressure sensing means to said indicator comprises a mechanical drive linkage connected to said bellows.

5. A vertical speed command instrument for an aircraft comprising:
- means for pneumatically sensing the rate of change of altitude of said aircraft and generating a first mechanical signal in accordance therewith,
- indicator means responsive to said first mechanical signal,
- means for sensing horizontal acceleration of said aircraft and generating a second mechanical signal in accordance with said acceleration, and
- means for coupling said second mechanical signal to said indicator means as an additive signal to said first signal,
- whereby said indicator means indicates the sum of the sensed aircraft altitude change rate and the rate of change of altitude anticipated in response to the horizontal acceleration of the aircraft.

6. The instrument of claim 5 wherein said means for pneumatically sensing altitude change rate comprises a bellows responsive to the rate of change of ambient pressure.

7. The instrument of claim 5 wherein said means for sensing horizontal aircraft acceleration comprises a pendulum, means for pivotally supporting the pendulum and wherein said means for coupling said mechanical signal in accordance with acceleration to said indicator means comprises a slip coupling.

8. The instrument of claim 7 wherein said slip coupling is a fluid coupling.

* * * * *